United States Patent
Mukherjee et al.

(10) Patent No.: US 8,381,258 B2
(45) Date of Patent: Feb. 19, 2013

(54) CREATING CHANNEL SEQUENCE SEGMENTS FOR FAST CHANNEL CHANGE IN IPTV

(75) Inventors: Sarit Mukherjee, Morganville, NJ (US); Limin Wang, Plainsboro, NJ (US)

(73) Assignee: Alcatel Lucent, Paris (FR)

( * ) Notice: Subject to any disclaimer, the term of this patent is extended or adjusted under 35 U.S.C. 154(b) by 487 days.

(21) Appl. No.: 12/270,990

(22) Filed: Nov. 14, 2008

(65) Prior Publication Data

US 2010/0125883 A1 May 20, 2010

(51) Int. Cl.
*H04N 7/173* (2011.01)
(52) U.S. Cl. .......................... 725/115; 725/91; 725/114
(58) Field of Classification Search .................. 725/91, 725/92, 93, 94, 95, 97, 114, 115, 116, 117, 725/118, 119

See application file for complete search history.

(56) References Cited

U.S. PATENT DOCUMENTS

| | | | |
|---|---|---|---|
| 2006/0080360 A1* | 4/2006 | Young et al. | 707/104.1 |
| 2007/0143808 A1* | 6/2007 | Agrawal et al. | 725/119 |
| 2007/0223475 A1* | 9/2007 | De Vleeschauwer et al. | 370/390 |
| 2007/0234395 A1* | 10/2007 | Dureau et al. | 725/135 |
| 2007/0250895 A1* | 10/2007 | Yamada | 725/134 |
| 2009/0083279 A1* | 3/2009 | Hasek | 707/10 |

* cited by examiner

*Primary Examiner* — John Schnurr
(74) *Attorney, Agent, or Firm* — Mendelsohn, Drucker & Associates, P.C.

(57) ABSTRACT

Embodiments of the present invention are methods for selecting, out of a lineup of IPTV channels, a subset of channels for caching. The methods take into account viewers' tendency to walk through the channels that lie between their current channel and their desired channel if that walking distance is short, and, alternatively, viewers' tendency to jump to a distant channel. Accordingly, embodiments of the present invention include any channel selection method which selects for caching any number of channels less than the entire lineup, and where at least two of those channels form a segment of adjacent channels. Other embodiments include methods which rely upon specific extrinsic data, e.g., IGMP and EPG information, for selecting a subset of channels to be cached.

22 Claims, 5 Drawing Sheets

CREATING CHANNEL SEQUENCE SEGMENTS FOR FAST CHANNEL CHANGE IN IPTV

BACKGROUND OF THE INVENTION

1. Field of the Invention

The present invention relates to electronics, specifically the proactive caching of electronic information for quick delivery to users.

2. Description of the Related Art

Internet Protocol Television

IPTV (Internet Protocol Television) is a protocol for the delivery of digital information over a network infrastructure using the Internet Protocol (IP). IPTV does not follow the typical unicast model of Internet communications. In the unicast model, a single requesting party requests a particular piece of information (e.g., an HTML page), and a serving party serves up that specific information in response to the request. Both requesting party and serving party possess unique IP addresses which allow the Internet hardware and software that connects those two parties (e.g., routers, switches, hubs, etc.) to route information between those two and only those two parties. Thus, going to www.youtube.com, selecting and watching a particular video is unicast streaming video, not IPTV.

In contrast, IPTV is based on a multicast model similar to broadcast technologies such as radio and TV. Like a TV transmitter or DBS satellite, an IPTV source (such as an IPTV server) continuously outputs one or more channels of TV programming as IP streams, and does so according to a pre-defined schedule, instead of serving up specific information in response to a request. Furthermore, intermediate routers and other Internet hardware do not deliver the IPTV channel streams to specific IP addresses, but instead multicast those streams to one or more multicast groups on a more-or-less continuous basis.

Although IPTV's delivery mechanism differs from delivery mechanism of traditional TV, the user interface is similar. IGMP streams are presented as numbered channels. The set of all the numbered channels is a lineup. Users can switch to a channel via the same methods present in traditional TV, e.g., entering a channel number directly (i.e., jumping), selecting a channel from an Electronic Program Guide (EPG), surfing (i.e., walking to) an adjacent channel by hitting a channel increment or decrement button, etc. Adjacent channels can be but need not be represented by consecutive channel numbers.

Users wishing to view a particular IPTV channel typically must join a multicast group to receive the IPTV channel, and leave the multicast group when they wish to view another IPTV channel. Internet Group Management Protocol (IGMP) is a protocol commonly used in IPTV systems for the management of multicast groups. IGMP performs group join/leave operations, and IPTV operators typically record information about these operations in the form of an IGMP log file. An IGMP log typically comprises any number of entries, where each entry represents an individual join/leave activity. IGMP log entries are typically in the form <user, time, channel (i.e., group), join/leave>.

IGMP takes a certain amount of time to perform a join/leave operation. Additionally, in IPTV, joining a multicast group often entails consulting an authentication server to verify that a subscriber is in fact entitled to join the requested multicast group (i.e., view the IPTV channel), an additional operation which takes a further amount of time.

Telephone companies (telcos), among others, deploy IPTV technology in order to deliver television programming to subscribers over digital subscriber line (DSL) infrastructure. FIG. 1 is a block diagram of a typical IPTV network 100. At the topmost level are Super Head-End Offices (SHO) 102. SHOs are computer facilities that acquire and aggregate content from multiple national content providers (e.g., Viacom, Time Warner, etc.). A typical telco will have two to four SHOs for the entire U.S.

SHOs 102 distribute the aggregated content to Video Head-End Offices (VHO) 106 over high-capacity core network 104. A typical aggregated-content stream will be a 10 gigabit-per-second (Gb/s) signal. A typical telco will have approximately forty VHOs, with each one located in major metropolitan areas. VHOs are typically responsible for the acquisition and insertion of local programming and advertising. A VHO might contain multiple distribution servers (D-Servers) 108 that buffer current video streams at the video source for speeding up user channel-change operations.

VHOs 106 relay content to Central Offices (CO) 110 over high-capacity metro ring 108. In a typical implementation, there are approximately 5-25 COs per VHO, and each CO is responsible for serving approximately 25,000 households.

COs 110 relay content to Digital Subscriber Line Access Modules (DSLAM) 112 over 1 Gb/s connections. In a typical implementation, there are no more than 80 DSLAMs per CO, and each DSLAM is responsible for serving approximately 400 households.

DSLAMs 112 relay content to end-user Set-Top Boxes (STB) 114 over 20 megabit-per-second (Mb/s) DSL connections. STBs connect to user television sets. In a typical implementation, there are two STBs per household, and thus each DSLAM is responsible for serving content to 800 STBs.

The content streamed over an IPTV network is typically video content encoded into digital data using a video encoder program which employs various data compression methods. A widely-used standard for video encoding is the Motion Pictures Expert Group (MPEG) standard. MPEG encoding achieves significant reductions in the size of the resulting digital data through, inter alia, the elimination of redundant inter-frame data. Most video content consists of a linear sequence of images, or frames. For example, films are typically recorded at 25-30 frames per second. Often, much of the information contained in adjacent frames is redundant, i.e., the picture element at coordinates x, y in frame N is approximately the same value as the picture element at those same coordinates in frame N+1 or N−1. Thus, instead of always sending complete frames, MPEG sends a complete frame (also known as an intra-coded frame or I-frame), and then sends one or more frames (known as P-frames and B-frames) which contain only the differences from immediately preceding or following frames.

At the receiving end, a typical MPEG decoder requires an I-frame before it can begin outputting a viewable signal. The number of I-frames encoded per second is specified by the entity performing the encoding, and typically ranges from one I-frame every half-second to one I-frame every second. Thus, if an IPTV channel has been encoded with an I-frame every second, it is possible that a subscriber selecting that channel may have to wait a second for the MPEG decoder to begin outputting a viewable signal.

Furthermore, the viewable output signal of an MPEG decoder is typically buffered so that intermittent and brief interruptions in the input signal of the decoder do not result in interruptions in the viewable signal. Typically, this buffer must be filled with viewable signal before the buffer begins transmitting viewable signal. Hence, there is a delay between when the buffer first receives viewable signal, and when that buffer begins outputting viewable signal.

The Problem of Channel-Change Latency in IPTV

Channel-change latency is the total time from the moment a viewing user selects a new/different channel, to the moment when that new channel's output appears on the screen. In IPTV systems, channel-change latency becomes a major challenge for providing satisfactory quality of experience to broadcast TV users. Viewers of analog, cable, and satellite TV have become accustomed to extremely low (e.g., sub-second) channel-change latency times, while IPTV channel-change latency is significantly larger (e.g., three seconds) due to IGMP join/leave operations, decoding the first available I-frame, and filling of the user buffer, among others.

Typically, obtaining and decoding the first available I-frame is the largest component of IPTV channel-change latency. One solution to this problem is to allow network elements close to the user to cache the most recent x seconds of channel programming as independently decodable frames, i.e., a rolling window cache of fully decoded video. When the user does selects a cached channel, the cached (independently decodable) frames are sent to the user video buffer while the STB performs the IGMP operations, receives the first I-frame, and fills its buffer.

Ideally, all channels would be cached, insuring lowest channel-change latency regardless of the channel chosen. However, bandwidth and other resource constraints often make the caching of all channels in a lineup impractical or wasteful. Thus, a typical implementation of a caching solution requires the operator to decide which channels are to be cached, and which are not. That decision directly impacts the effectiveness of channel caching on reducing channel-change latency, and the bandwidth consumption due to channel caching. Complicating this decision is the diversity and dynamics of user interests and TV program lineup settings.

Popularity is one method for selecting which channels are to be cached. If $V_C$ is the number of viewers that viewed a channel C during time T, and $M_C$ is the average number of minutes viewers $V_C$ viewed channel C, then popularity $P_C$ of channel C may be represented by $V_C \times M_C$. Those channels with the largest $P_C$ values are cached. An alternative method for determining $P_C$ is to use third-party polling data, e.g., Nielsen.

However, just because a channel is unpopular does not necessarily mean it is not visited often. Users often walk through the channels adjacent to the currently watched channel for various reasons, e.g., to go to a destination channel not far from the current channel, to see what's on nearby channels during a commercial break, etc. In contrast, a user will often jump directly from one popular channel to another if the distance between those two channels is sufficiently large. Thus, there may be unpopular channels (i.e., channels with low $P_C$ values) that are nevertheless visited often (i.e., have high IGMP join counts) because they are close to a popular channel.

SUMMARY OF THE INVENTION

Embodiments of the present invention are methods for selecting IPTV channels for caching. In one embodiment, the method gathers information related to the IPTV channels, wherein, for each IPTV channel, the information corresponds to one or more of (i) number of viewing sessions, (ii) average session duration, and (iii) predicted popularity. Second, the methods derive from the gathered information, for each IPTV channel, one or more of (i) the number of viewing sessions, (ii) the average session duration, and (iii) the predicted popularity. Third, the methods select one or more IPTV channels for caching based on one or more of (i) the number of viewing sessions, (ii) the average session duration, and (iii) the predicted popularity.

In another embodiment, the method gathers information related to the IPTV channels and selects a subset of the IPTV channels for caching based on the gathered information, wherein at least two of the selected IPTV channels form a segment of adjacent IPTV channels.

BRIEF DESCRIPTION OF THE DRAWINGS

Other aspects, features, and advantages of the invention will become more fully apparent from the following detailed description, the appended claims, and the accompanying drawings in which like reference numerals identify similar or identical elements.

DETAILED DESCRIPTION

Embodiments of the present invention address the problem of picking proper channels to cache for fast channel change in IPTV systems, striking a balance between reducing channel-change latency and avoiding unnecessary bandwidth consumption. Embodiments of the present invention improve the quality of experience of users in state-of-the-art IPTV systems.

Figure 2:
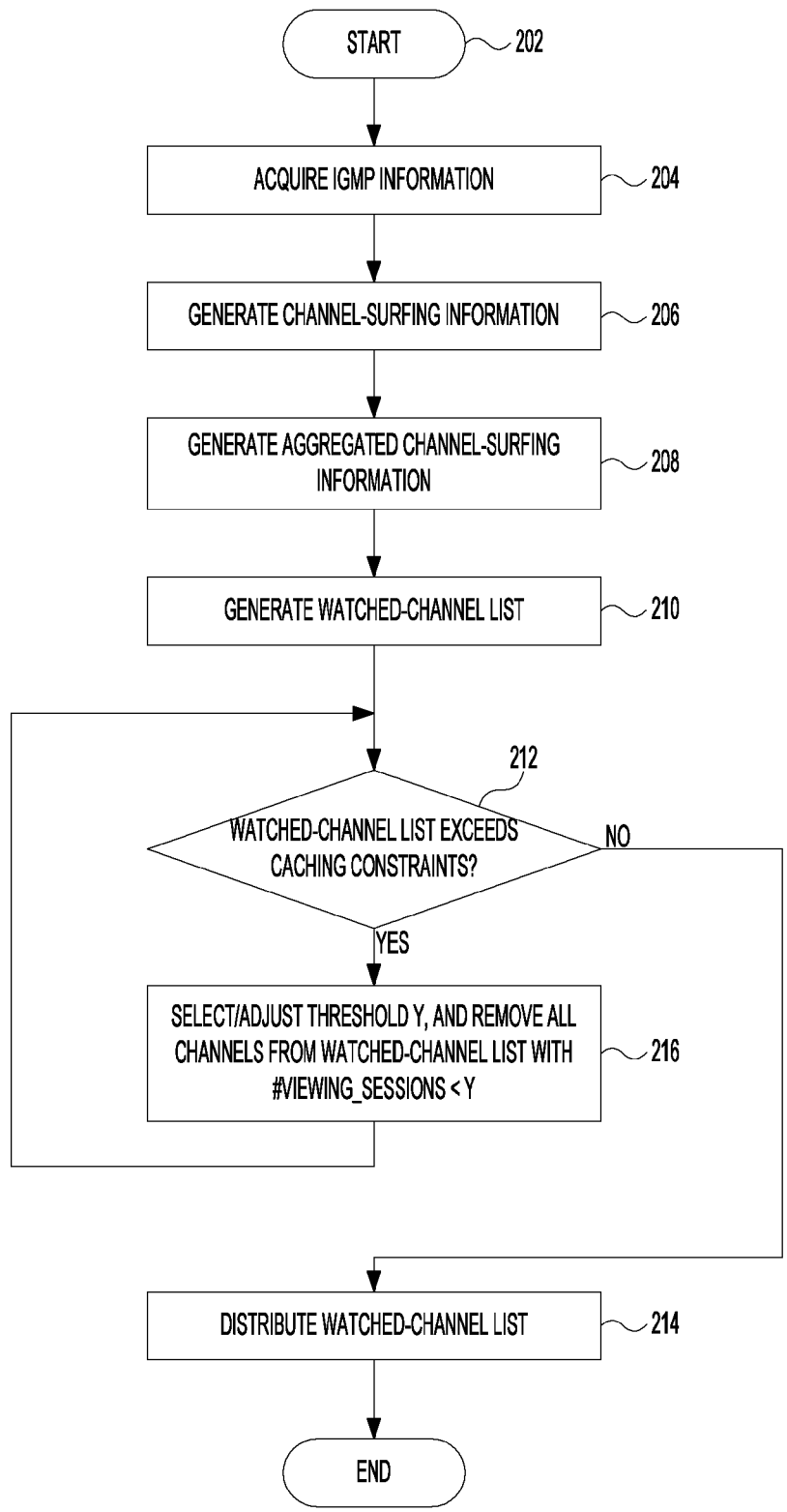
FIG. 2 is a flowchart of a method based on number of viewing sessions according to one embodiment of the present invention.
Figure 3:
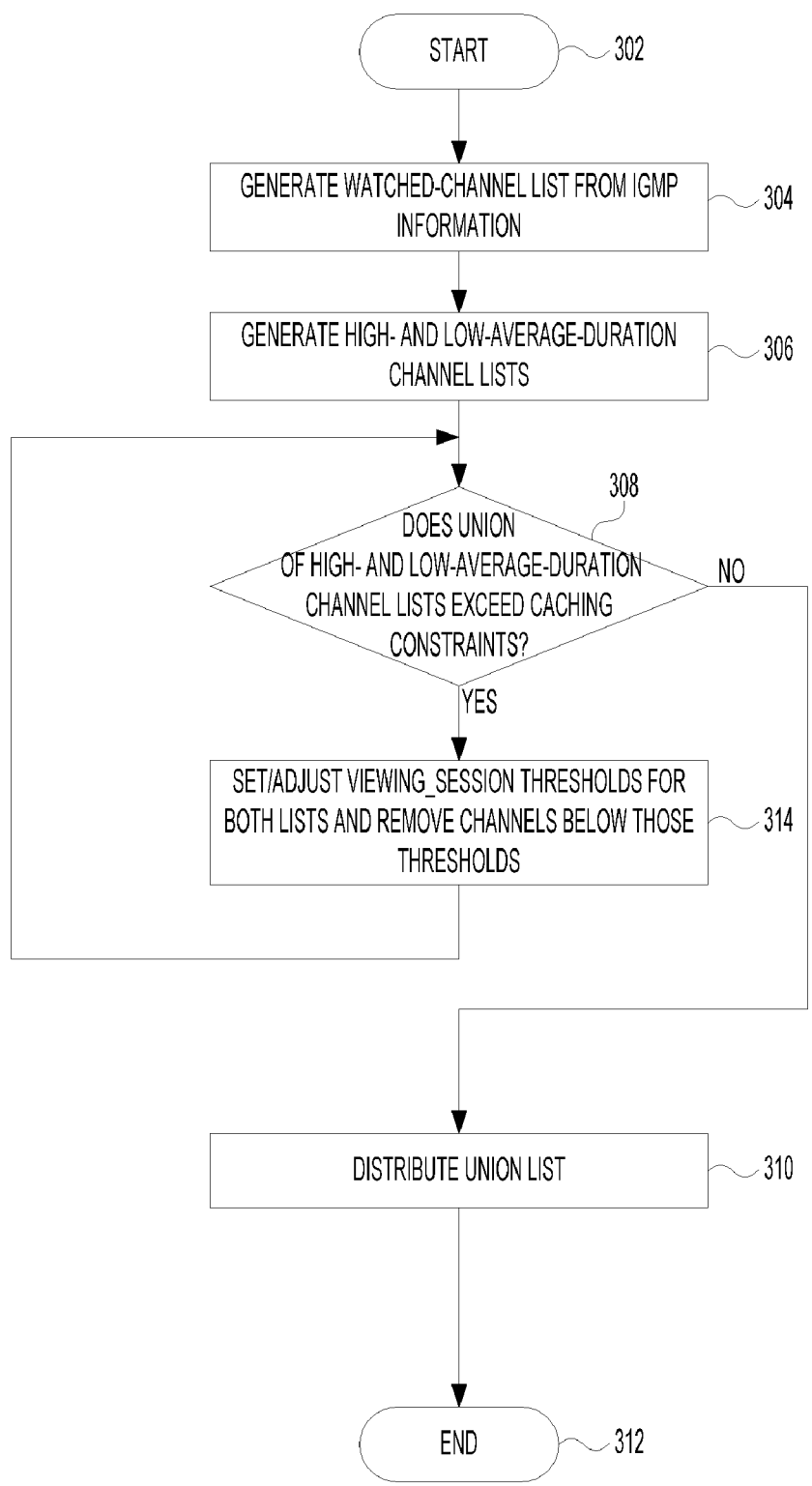
FIG. 3 is a flowchart of a method based on average duration and number of viewing sessions according to one embodiment of the present invention.

According to certain embodiments of the present invention, two or more adjacent channels are selected for caching. Such selection of adjacent channels for caching can be (but does not necessarily have to be) achieved using algorithms based on any combination of one or more of the following three values: the number of viewing sessions over a defined time interval for each channel (e.g., #viewing_sessions), the average duration of viewing sessions for each channel (e.g., avg_duration), and predicted popularity. For example, the method of FIG. 2 is based on #viewing_sessions, while the method of FIG. 3 is based on #viewing_sessions and avg_duration, etc. Note that algorithms based on combinations of these three values can also result in selection of non-adjacent channels for caching.

Method Based on Number of Viewing Sessions

FIG. 2 is a flowchart of a method based on number of viewing sessions according to one embodiment of the present invention. The method starts at step 202 and proceeds to step 204, where Internet Group Management Protocol (IGMP) information is acquired, either by copying an IGMP log file from a video broadcast server at a Video Head-End Office (VHO) (if such log file exists) or through IGMP snooping at any point in the network between the user's Set-Top Box (STB) and the VHO.

Step 206 generates channel-surfing information in the form of <channel_id, duration, user_group (CO/DSLAM)> from the acquired IGMP information.

For every time interval t, step 208 generates aggregated channel-surfing information in the form of <channel_id, avg_duration, #viewing_sessions> from the channel-surfing information. Time interval t can be fixed (e.g., 30 minutes), or it can be variable based on time of day (e.g., prime time vs. day time), length of average TV program (e.g., start/end vs. during a program), etc.

Field #viewing_sessions represents the total number of viewing sessions for the channel indicated by field channel_id during time interval t. A single viewing session is defined as an uninterrupted viewing of the channel by a single viewer during time interval t, no matter how short or long the viewing is, and regardless of whether the viewer started watching before the start of time interval t, or continued watching beyond the end of time interval t. Thus, if, during time interval t, a viewer V (i) watches channel C, (ii) leaves channel C, and (iii) returns to channel C, then the number of viewing sessions for viewer V is two, not one.

Note that #viewing_sessions is not synonymous with IGMP join operations. For example, viewer V joins channel C during time interval t, and continues watching channel C past the end of time interval t and into the next time interval $t_2$. There will be a viewing session for channel C due to viewer V during time interval $t_2$, although there is no corresponding IGMP join operation during $t_2$. Similarly, a single viewing session is created for channel C during time interval t if viewer V joins channel C during time interval t and continues watching channel C past the end of t. Likewise, a single viewing session is created for channel C during time interval t if viewer V joins channel C before the start of time interval t and continues watching channel C past the end of time interval t.

Field avg_duration indicates the average duration of the all the viewing sessions for channel C during time interval t.

Step 210 generates from the aggregated channel-surfing information a watched-channel list comprising all the channels with non-zero #viewing_sessions. The watched-channel list is sorted according to the standard channel lineup, i.e., in channel number order. A number of channel segments can be formed based on the watched-channel list. A segment is defined here as any single channel or sequence of two or more adjacent channels. In the extreme case, all channels in the standard channel lineup form a single segment.

Step 212 determines whether the watched-channel list exceeds the caching constraints of the system. If not, then, at step 214, the watched-channel list is distributed as the caching list. Otherwise, if the number of channels in the watched-channel list exceeds the resource constraints of the IPTV network, then, at step 216, a threshold y is set (initial iteration) or adjusted (subsequent iterations) and all channels for which #viewing_sessions is less than y are removed. This step typically eliminates more channels. Depending on which channels are eliminated, the results may include one or more segments of two or more adjacent channels. Once channels have been purged at step 216, processing loops back to step 212.

Method Based on Average Duration and Number of Viewing Sessions

FIG. 3 is a flowchart of a method based on average duration and number of viewing sessions according to one embodiment of the present invention. The method starts at step 302 and proceeds to step 304, where a watched-channel list is generated from IGMP information. This step is the same as steps 204, 206, 208, and 210 of FIG. 2.

Step 306 selects sorts the records of the watched-channel list into two lists: (i) a high-average-duration channel list comprising a specified percentage of channels with the largest avg_duration values and (ii) a low-average-duration channel list comprising the remaining channels.

Step 308 determines whether the union of the high- and low-average-duration channel lists exceeds the system caching constraints. If not, then, at step 310, the union list is distributed as the caching list, and the process at step 312 is terminated.

Otherwise, if, at step 308, the number of channels in the union list exceeds the resource constraints of the IPTV network, then, at step 314, a #viewing_sessions threshold y is set (initial iteration) or adjusted (successive iterations), and every channel with #viewing_sessions <y is removed from the high-average-duration channel list. This eliminates those channels which have large avg_duration values, but very few viewers. Also, at step 314, a #viewing_sessions threshold z is selected, where z>y. All those channels with #viewing_sessions<z are removed from the low-average-duration channel list. Processing then loops back to step 308.

Method Based on Predicted Popularity

Figure 4:
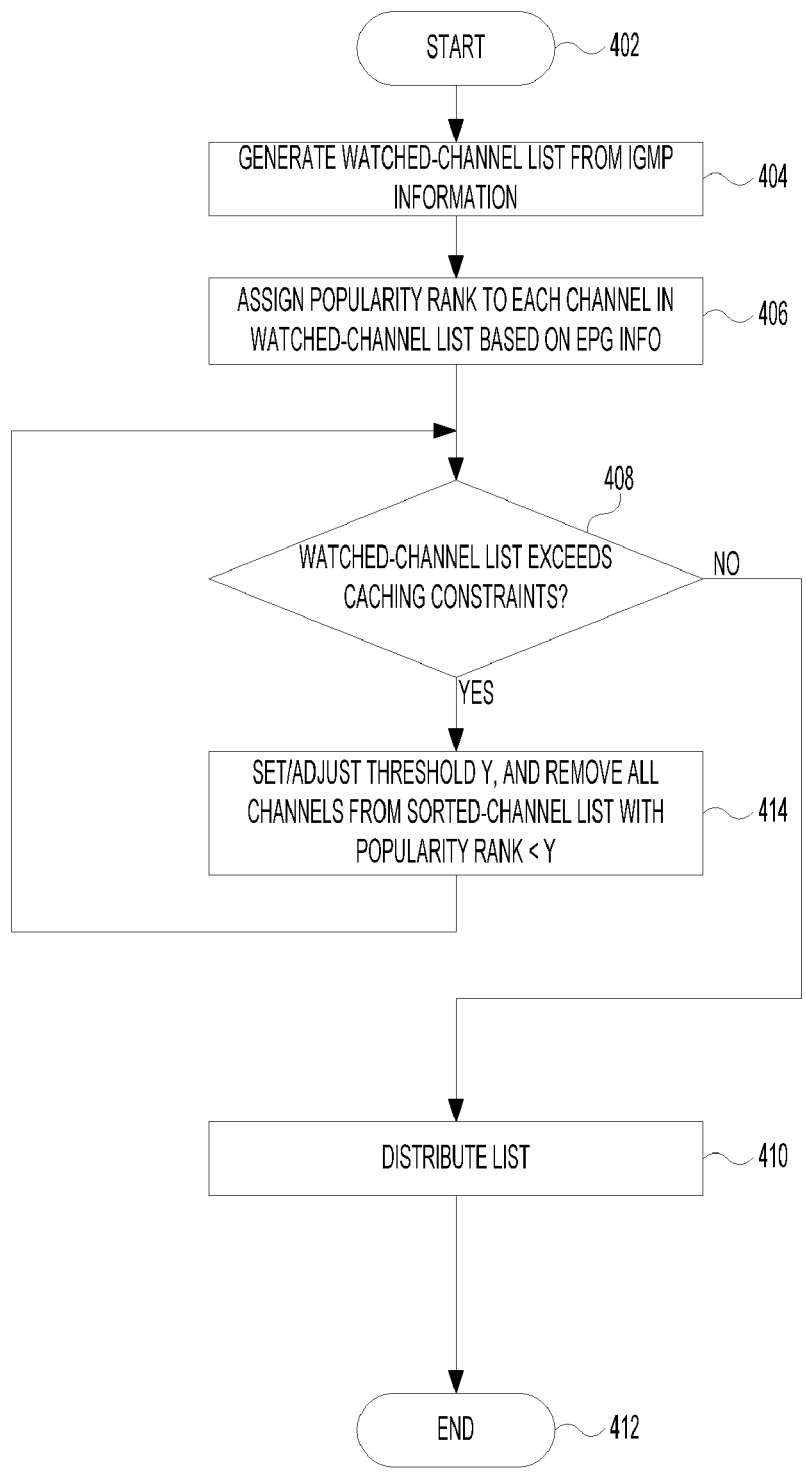
FIG. 4 is a flowchart of a method based on predicted popularity according to one embodiment of the present invention.

FIG. 4 is a flowchart of a method based on predicted popularity according to one embodiment of the present invention. Predicted popularity is a measure of the likelihood that a particular channel will be watched at a particular time based on past channel history. For example, Nielsen ratings can be used to generate a predicted popularity ranking. Assume, for example, that, during a particular time slot, ABC has a Nielson rating of 1.2, NBC has a rating of 1.5, and CSPAN has a rating 0.3. In that case, a predicted popularity ranking could have NBC with a predicted popularity rank of 1.5, ABC 1.2, and CSPAN 0.3.

The method starts at step 402 and proceeds to step 404, where a watched-channel list is generated from IGMP information. This step is the same as steps 204, 206, 208, and 210 of FIG. 2.

Step 406 assigns a predicted popularity rank to each channel based on its current program information in the Electronic Program Guide (EPG), e.g., Nielsen rating, genre, and time of day, etc.

Step 408 determines whether the watched-channel list exceeds the caching constraints of the system. If not, then step 410 distributes the sorted-channel list and the process terminates at step 412. Otherwise, step 414 sets (initial iteration) or increases (subsequent iterations) a threshold y, and removes those channels with popularity ranking values lower than y. Step 414 may result in the formation of one or more segments of two or more adjacent channels. Processing then loops back to step 408.

Method Based on Predicted Popularity and Average Duration

Figure 5:
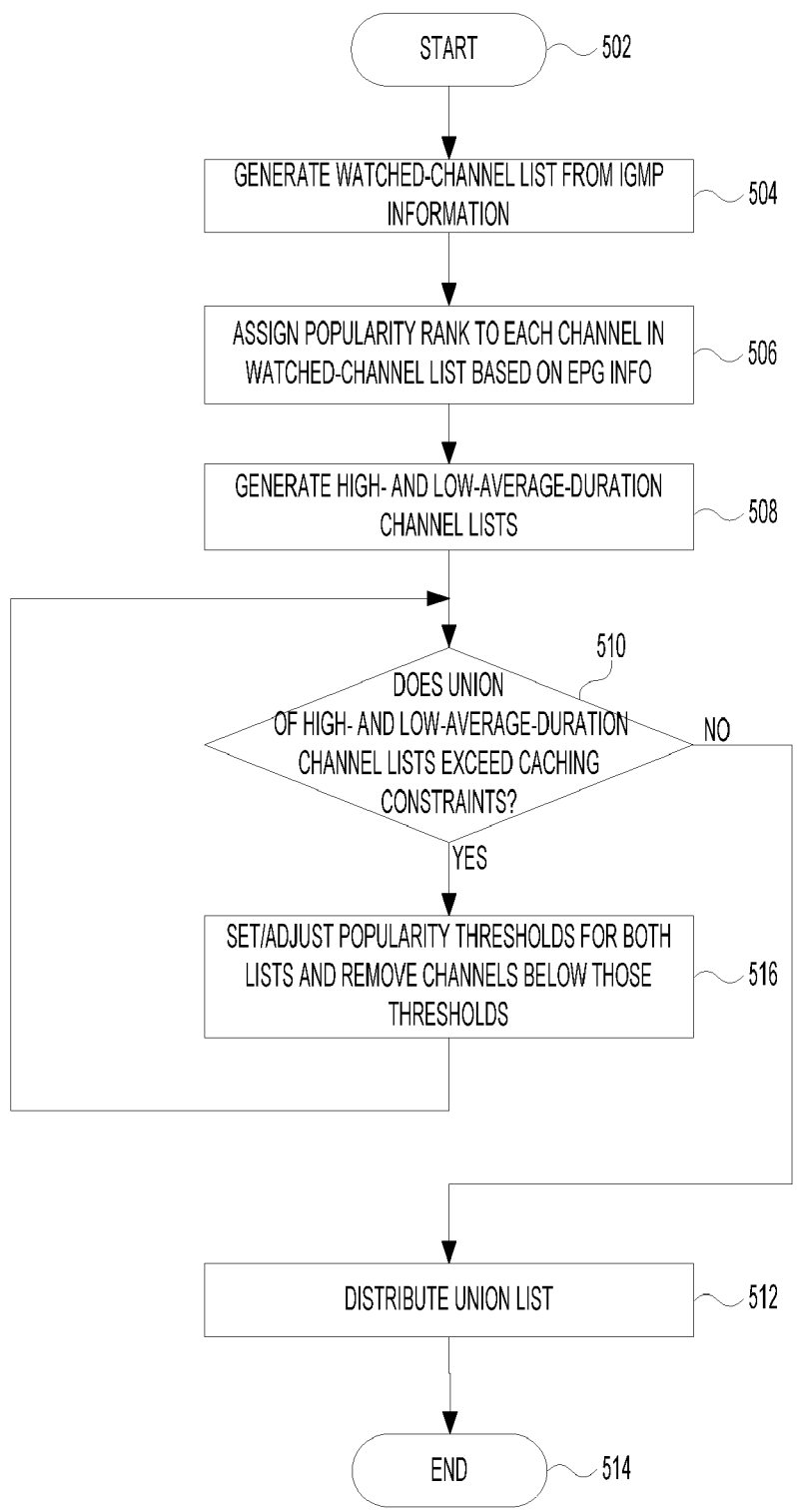
FIG. 5 is a flowchart of a method based on predicted popularity and average duration according to one embodiment of the present invention.

FIG. 5 is a flowchart of a method based on predicted popularity and average duration according to one embodiment of the present invention. The method starts at step 502 and proceeds to step 504, where a watched-channel list is generated from IGMP information. This step is the same as steps 204, 206, 208, and 210 of FIG. 2.

Step 506 assigns a popularity rank to each channel based on its current program information in the EPG, e.g., Nielsen rating, genre and time of day, etc.

Step 508 sorts the records of the watched-channel list into two lists: (i) a high-average-duration channel list comprising a specified percentage of channels with the largest avg_duration values and (ii) a low-average-duration channel list comprising the remaining channels.

Step 510 determines whether the union of the high- and low-average-duration channel lists exceeds the system caching constraints. If not, then, at step 512, the union list is distributed as the caching list, and the process at step 514 is terminated.

Otherwise, if, at step 510, the number of channels in the union list exceeds the resource constraints of the IPTV network, then, at step 516, a popularity threshold y is set (initial iteration) or adjusted (subsequent iterations) and every channel with popularity<y is removed from the high-average-duration channel list. This eliminates those channels which have large popularity values, but very few viewers. Also, at step 516, a popularity threshold z is set (initial iteration) or adjusted (subsequent iterations), where z>y. All those channels with popularity<z are removed from the low-average-duration channel list. Processing then loops back to step 510.

Figure 1:
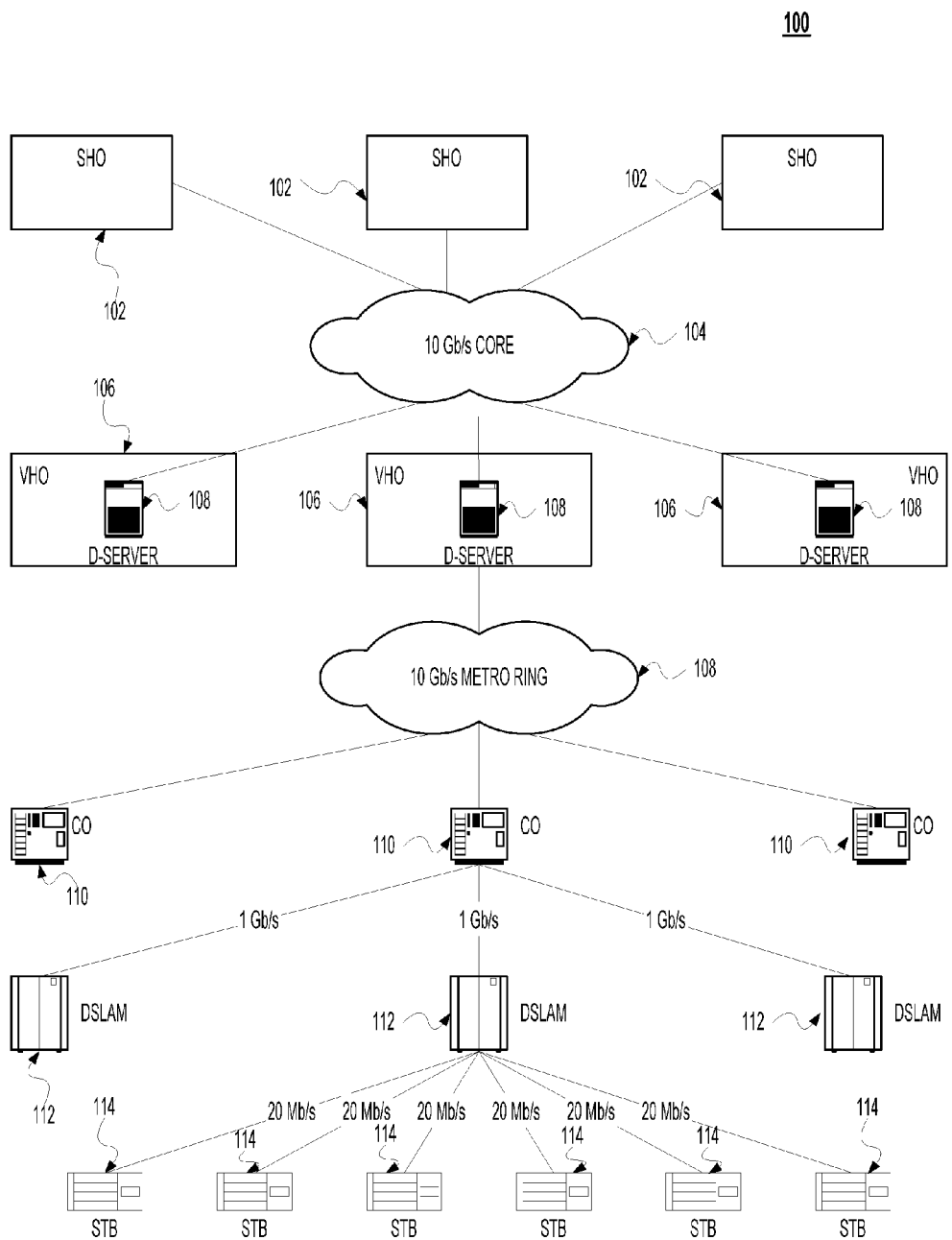
FIG. 1 is a block diagram of a typical IPTV network 100.

Certain embodiments of the present invention involve the selection of channels for caching and the caching of those selected channels. Depending on the particular implementation, these selection and caching steps can be implemented at a single network node or at two different nodes located at different network levels. For example, referring to FIG. 1, the selection and caching steps could both be implemented at any one of a D-server 108, a CO 110, or a DSLAM 112. Alternatively, the selection step could be implemented at a D-server 108, while the corresponding caching step could be implemented at a corresponding CO 110 or a corresponding DSLAM 112. Similarly, the selection step could be implemented at a CO 110, while the corresponding caching step could be implemented at a corresponding DSLAM 112.

The various channel selection methods described above can be implemented at the VHO, CO, or DSLAM level in an IPTV network (e.g., 100 of FIG. 1), Furthermore, channel selection and channel caching can be performed at the same network level or at a different levels. For example, the selection of the channels to be cached might be performed at the CO level (e.g., 110 of FIG. 1), but the actual caching of those selected channels might be performed by the DSLAMs (e.g. 112 of FIG. 1).

The present invention can be embodied in the form of methods and apparatuses for practicing those methods. The present invention can also be embodied in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

Unless explicitly stated otherwise, each numerical value and range should be interpreted as being approximate as if the word "about" or "approximately" preceded the value of the value or range.

It will be further understood that various changes in the details, materials, and arrangements of the parts which have been described and illustrated in order to explain the nature of this invention may be made by those skilled in the art without departing from the scope of the invention as expressed in the following claims.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

We claim:

1. A method for selecting IPTV channels for caching, the method implemented at one or more nodes of an IPTV network and comprising:
    (a) the one or more nodes gathering information related to the IPTV channels, wherein, for each IPTV channel, the information corresponds to one or more of (i) number of viewing sessions, (ii) average session duration, and (iii) predicted popularity;
    (b) the one or more nodes deriving from the gathered information, for each IPTV channel, one or more of (i) the number of viewing sessions, (ii) the average session duration, and (iii) the predicted popularity;
    (c) the one or more nodes comparing, for each IPTV channel, one or more of (i) the number of viewing sessions, (ii) the average session duration, and (iii) the predicted popularity to one or more respective specified thresholds, wherein the one or more respective specified thresholds are determined prior to the comparison; and
    (d) the one or more nodes selecting two or more IPTV channels for caching based on the one or more comparisons of step (c) and a requirement that at least two of the two or more IPTV channels be adjacent to one another, wherein the one or more respective thresholds are selected based on the requirement that at least two of the two or more IPTV channels be adjacent to one another.

2. The invention of claim 1, further comprising caching the two or more selected IPTV channels.

3. The invention of claim 2, wherein the selecting and the caching are implemented at a single network node.

4. The invention of claim 2, wherein the selecting and the caching are implemented at two different network nodes located at two different network levels.

5. The invention of claim 1, wherein:
    step (a) comprises gathering information related to IPTV channels, wherein, for each IPTV channel, the information corresponds to the number of viewing sessions;

step (b) comprises deriving from the gathered information, for each IPTV channel, the number of viewing sessions; and step (d) comprises selecting the one or more IPTV channels for caching based on the number of viewing sessions.

6. The invention of claim 5, wherein:

the gathered information includes internet group management protocol (IGMP) data; and the number of viewing sessions is derived from the IGMP data.

7. The invention of claim 5, wherein:

step (c) comprises comparing, for each IPTV channel, the average session duration to a first specified threshold; and step (d) comprises selecting the one or more IPTV channels for caching based on the comparisons of step (c).

8. The invention of claim 1, wherein:

step (a) comprises gathering information related to IPTV channels, wherein, for each IPTV channel, the information corresponds to the average session duration;

step (b) comprises deriving from the gathered information, for each IPTV channel, the average session duration; and step (d) comprises selecting the one or more IPTV channels for caching based on the average session duration.

9. The invention of claim 8, wherein:

step (a) further comprises gathering information related to IPTV channels, wherein, for each IPTV channel, the information corresponds to the number of viewing sessions;

step (b) further comprises deriving from the gathered information, for each IPTV channel, the number of viewing sessions; and step (d) comprises selecting the one or more IPTV channels for caching based on average session duration and the number of viewing sessions.

10. The invention of claim 9, wherein:

step (c) comprises:
  (c1) generating a first list of IPTV channels having average session durations greater than a specified first threshold and a second list of IPTV channels having average session durations less than the specified first threshold;
  (c2) modifying the first list by removing one or more IPTV channels having number of viewing sessions less than a specified second threshold; and
  (c3) modifying the second list by removing one or more IPTV channels having number of viewing sessions less than a specified third threshold greater than the specified second threshold; and step (d) comprises combining the modified first and second lists to generate a list of the selected one or more IPTV channels for caching.

11. The method of claim 10 wherein one or more of the specified first, second, and third thresholds are adjusted such that the list of the selected two or more IPTV channels for caching comprises at least one segment of two or more adjacent IPTV channels.

12. The invention of claim 8, wherein:

the gathered information includes IGMP data; and the average session duration is derived from the IGMP data.

13. The invention of claim 1, wherein:

step (a) comprises gathering information related to IPTV channels, wherein, for each IPTV channel, the information corresponds to the predicted popularity;

step (b) comprises deriving from the gathered information, for each IPTV channel, the predicted popularity; and step (d) comprises selecting the one or more IPTV channels for caching based on the predicted popularity.

14. The invention of claim 13, wherein:

step (a) further comprises gathering information related to IPTV channels, wherein, for each IPTV channel, the information corresponds to the average session duration;

step (b) further comprises deriving from the gathered information, for each IPTV channel, the average session duration; and step (d) comprises selecting the one or more IPTV channels for caching based on the predicted popularity and the average session duration.

15. The invention of claim 14, wherein:

step (c) comprises:
  (c1) generating a first list of IPTV channels having average session durations greater than a specified first threshold and a second list of IPTV channels having average session durations less than the specified first threshold;
  (c2) modifying the first list by removing one or more IPTV channels having predicted popularity less than a specified second threshold; and
  (c3) modifying the second list by removing one or more IPTV channels having predicted popularity less than a specified third threshold greater than the specified second threshold; and step (d) comprises combining the modified first and second lists to generate a list of the selected one or more IPTV channels for caching.

16. The invention of claim 13, wherein:

the gathered information includes electronic program guide (EPG) data; and the number of viewing sessions is derived from the EPG data.

17. The invention of claim 13, wherein:

step (c) comprises comparing, for each IPTV channel, the predicted popularity to a first specified threshold; and step (d) comprises selecting the one or more IPTV channels for caching based on the comparisons of step (c).

18. One or more nodes of an IPTV network, wherein the one or more nodes are adapted to:

(a) gather information related to IPTV channels, wherein, for each IPTV channel, the information corresponds to one or more of (i) number of viewing sessions, (ii) average session duration, and (iii) predicted popularity;

(b) derive from the gathered information, for each IPTV channel, one or more of (i) the number of viewing sessions, (ii) the average session duration, and (iii) the predicted popularity, wherein the one or more respective specified thresholds are determined prior to the comparison;

(c) compare, for each IPTV channel, one or more of (i) the number of viewing sessions, (ii) the average session duration, and (iii) the predicted popularity to one or more respective specified thresholds; and (d) select two or more IPTV channels for caching based on the comparisons and a requirement that at least two of the two or more IPTV channels be adjacent to one another, wherein the one or more respective thresholds are selected based on the requirement that at least two of the two or more IPTV channels be adjacent to one another.

19. A method for selecting IPTV channels for caching, the method implemented at one or more nodes of an IPTV network and comprising:
(a) the one or more nodes gathering information related to the IPTV channels, wherein, for each IPTV channel, the information corresponds to (i) number of viewing sessions and (ii) average session duration;
(b) the one or more nodes deriving from the gathered information, for each IPTV channel, (i) the number of viewing sessions and (ii) the average session duration;
(c) the one or more nodes comparing, for each IPTV channel, (i) the number of viewing sessions and (ii) the average session duration to one or more respective specified thresholds, wherein step (c) comprises:
  (c1) generating a first list of IPTV channels having average session durations greater than a specified first threshold and a second list of IPTV channels having average session durations less than the specified first threshold;
  (c2) modifying the first list by removing one or more IPTV channels having number of viewing sessions less than a specified second threshold; and
  (c3) modifying the second list by removing one or more IPTV channels having number of viewing sessions less than a specified third threshold greater than the specified second threshold; and
(d) the one or more nodes selecting one or more IPTV channels for caching based on the average session duration and the number of viewing sessions, wherein step (d) comprises combining the modified first and second lists to generate a list of the selected one or more IPTV channels for caching.

20. The method of claim 19, wherein one or more of the specified first, second, and third thresholds are adjusted such that the list of the selected one or more IPTV channels for caching comprises at least one segment of two or more adjacent IPTV channels.

21. A method for selecting IPTV channels for caching, the method implemented at one or more nodes of an IPTV network and comprising:
(a) the one or more nodes gathering information related to the IPTV channels, wherein, for each IPTV channel, the information corresponds to (i) average session duration and (ii) predicted popularity;
(b) the one or more nodes deriving from the gathered information, for each IPTV channel, (i) the average session duration and (ii) the predicted popularity;
(c) the one or more nodes comparing, for each IPTV channel, (i) the average session duration and (ii) the predicted popularity to one or more respective specified thresholds, wherein step (c) comprises:
  (c1) generating a first list of IPTV channels having average session durations greater than a specified first threshold and a second list of IPTV channels having average session durations less than the specified first threshold;
  (c2) modifying the first list by removing one or more IPTV channels having predicted popularity less than a specified second threshold; and
  (c3) modifying the second list by removing one or more IPTV channels having predicted popularity less than a specified third threshold greater than the specified second threshold; and
(d) the one or more nodes selecting one or more IPTV channels for caching based on the predicted popularity and the average session duration, wherein step (d) comprises combining the modified first and second lists to generate a list of the selected one or more IPTV channels for caching.

22. A method for selecting IPTV channels for caching, the method implemented at one or more nodes of an IPTV network and comprising:
(a) the one or more nodes gathering information related to the IPTV channels, wherein, for each IPTV channel, the information corresponds to number of viewing sessions;
(b) the one or more nodes deriving from the gathered information, for each IPTV channel, the number of viewing sessions;
(c) the one or more nodes comparing, for each IPTV channel, average session duration to a first specified threshold; and
(d) the one or more nodes selecting one or more IPTV channels for caching based on the number of viewing sessions and the comparison of step (c).

* * * * *